United States Patent [19]

Palfinger

[11] Patent Number: 4,558,879
[45] Date of Patent: Dec. 17, 1985

[54] TRAILER FOR A TRUCK

[75] Inventor: Richard Palfinger, Salzburg, Austria

[73] Assignee: Palfinger, Austria

[21] Appl. No.: 531,826

[22] PCT Filed: Nov. 18, 1982

[86] PCT No.: PCT/AT82/00033
§ 371 Date: Aug. 12, 1983
§ 102(e) Date: Aug. 12, 1983

[87] PCT Pub. No.: WO83/02258
PCT Pub. Date: Jul. 7, 1983

[30] Foreign Application Priority Data
Dec. 24, 1981 [AT] Austria .................................. 5562/81

[51] Int. Cl.[4] .............................................. B60P 1/54
[52] U.S. Cl. .................................. 280/406 R; 280/474
[58] Field of Search ............... 280/474, 406 R, 405 R, 280/492

[56] References Cited

U.S. PATENT DOCUMENTS

| 2,720,417 | 10/1955 | Kling | 280/474 X |
| 3,342,357 | 9/1967 | Larson | 414/363 |
| 3,425,715 | 2/1969 | Weitz | 280/474 X |
| 3,663,039 | 5/1972 | Morgan | 280/474 X |
| 3,717,215 | 2/1973 | Nigg | 280/474 X |
| 3,815,939 | 6/1974 | Pettay | 280/474 |
| 4,200,315 | 4/1980 | Carlsson | 280/474 X |

FOREIGN PATENT DOCUMENTS

| 186392 | 10/1953 | Austria . |
| 957329 | 11/1974 | Canada . |
| 2320208 | 3/1977 | France . |
| 2344219 | 10/1977 | France . |

Primary Examiner—John A. Pekar
Attorney, Agent, or Firm—Pahl, Lorusso & Loud

[57] ABSTRACT

The supporting frame (1) for the loading crane of a truck (2) is transported by a trailer, whose swingability is blocked in the operating position of the loading crane. In the operating position the truck (2) is rigidly connected to the supporting frame (1) via hydraulic units (5,8).

3 Claims, 3 Drawing Figures

TRAILER FOR A TRUCK

The invention relates to a trailer for a truck with a supporting frame for a loading crane or the like, the trailer being selectively flexibly or rigidly connected to the truck.

DESCRIPTION OF THE PRIOR ART

When fastening a loading crane to the rear end of a truck problems can arise in two respects. First it must be remembered that by the actuation of the loading crane substantial moments are transmitted to the vehicle which is not equipped to absorb them. The loads alone which a typical crane can carry are in the tonnage range and swinging moments of more than 10 kNm are quite common. When the load is ahead of the crane tower these moments can be completely absorbed by the vehicle itself. When swinging out laterally, support spars, which can be extended laterally, relieve the vehicle. A jack wheel which is hinged to a shaft extending at right angles to the direction of the vehicle by means of at least one swivel arm extending to the rear and supported and fixed from above in the operating position by a holding means has been proposed for supporting the vehicle console towards the rear (see Austrian Pat. No. 186,392). However, the jack wheel permits only slight shifting of the vehicle on the site of operation and does not solve the second problem caused by the arrangement of the loading crane in the rear region of the vehicle. This is due to the fact that the dead weight of the crane of the order of 1 to 2 tons increases the axle pressure on the rear wheels to an inadmissible extent and excessively relieves the front wheels when driving uphill. This latter difficulty is responsible for the fact that heretofore loading cranes have been excluded from a field of application for which they should be predestined per se, namely their use in conjunction with mobile concrete mixers. Additionaly to the concrete mixer conveyer belts or self-contained pumping cars are used for this purpose requiring separate operating personnel and thus increasing the concreting costs particularly for small building projects. This can be remedied by loading cranes whose conveying capacity of approximately 0.5 cu m per turn permits a sufficiently fast unloading to various terminals and which can be operated by the driver of the mixer. However, the mixers are so designed so that a heavy loading crane cannot additionally be attached directly to the rear of a vehicle.

As a result of the above-mentioned there exists a need for trailers which permit selective transportation of heavy loading cranes without substantially impairing the driving characteristics of the traction vehicle and which form a solid basis for the working device, particularly for a loading crane, when the traction vehicle stops. This type of trailer having the features initially set forth has already been proposed in French Pat. No. 2,320,208. However, a console which can be rigidly connected in a conventional manner to the traction vehicle is provided on the one hand and an extensible spar on the other. This spar can be flexibly suspended in a coupling when the console is no longer connected to the traction vehicle. The rigid connection between console and traction vehicle is always brought about in the same manner without any possibility of taking into account unevennesses of the ground. Therefore, it cannot be assured that the wheels of the trailer function as supports for the console during the operating phase. Therefore, in order to prevent tilting of the front portion of the traction vehicle by the operating crane, extensible supports which completely relieve the wheels of the trailer must be provided.

Therefore, the entire construction is so cumbersome that it has not been used in practice.

OBJECT OF THE INVENTION

It is the object of the present invention to provide a trailer of the type initially described, i.e., a trailer which is of simple construction and whose wheels in the operating position rest firmly even on rough ground so that these unevennesses do not cause a tilting moment exerted on the traction vehicle.

The set task is solved in that the supporting frame for the loading crane is pivotable about a vertical shaft and a transversely extending horizontal shaft with respect to a fastening means rigidly but detachably connectable to the end portion of the truck, and that means for blocking the pivotable motion at least about the horizontal shaft are provided.

SUMMARY OF THE INVENTION

According to the present invention the connection of the trailer to the end portion of the truck is always produced in the manner disclosed, for example, in French Pat. No. 2,320,208 or in a more elegant manner disclosed in Austrian Pat. No. 315,422. When being driven, the trailer is swingable with respect to its portion rigidly secured to the end portion of the truck. When driving forward the wheels trail the truck and when reversing, truck and trailer form an angle in the conventional manner.

Because of the horizontal swingability of the supporting frame for the loading crane the wheels secured thereto can follow even greater roughness of the ground. The fixing of the supporting frame relative to the truck which is indispensable when in operation, can thus also be achieved in a position in which the bottom of the supporting frame is not completely parallel to that of the truck.

The blocking of the swivel axle which allows swinging the trailer upwards and downwards relative to the truck can be carried out in various ways. It would definitely be possible that, when the loading crane is in operation, a rigid spar is installed between the parts which otherwise are swingable relative to each other and thus to stop the swinging motion. The same effect can be attained in a simpler manner by means of a blockable hydraulic unit, which will be explained hereafter in greater detail with reference to the accompanying drawings.

DESCRIPTION OF THE FIGURES OF THE DRAWING

In the drawing an embodiment of the invention is described, in which.

DESCRIPTION OF THE PREFERRED EMBODIMENT

Figure 1:
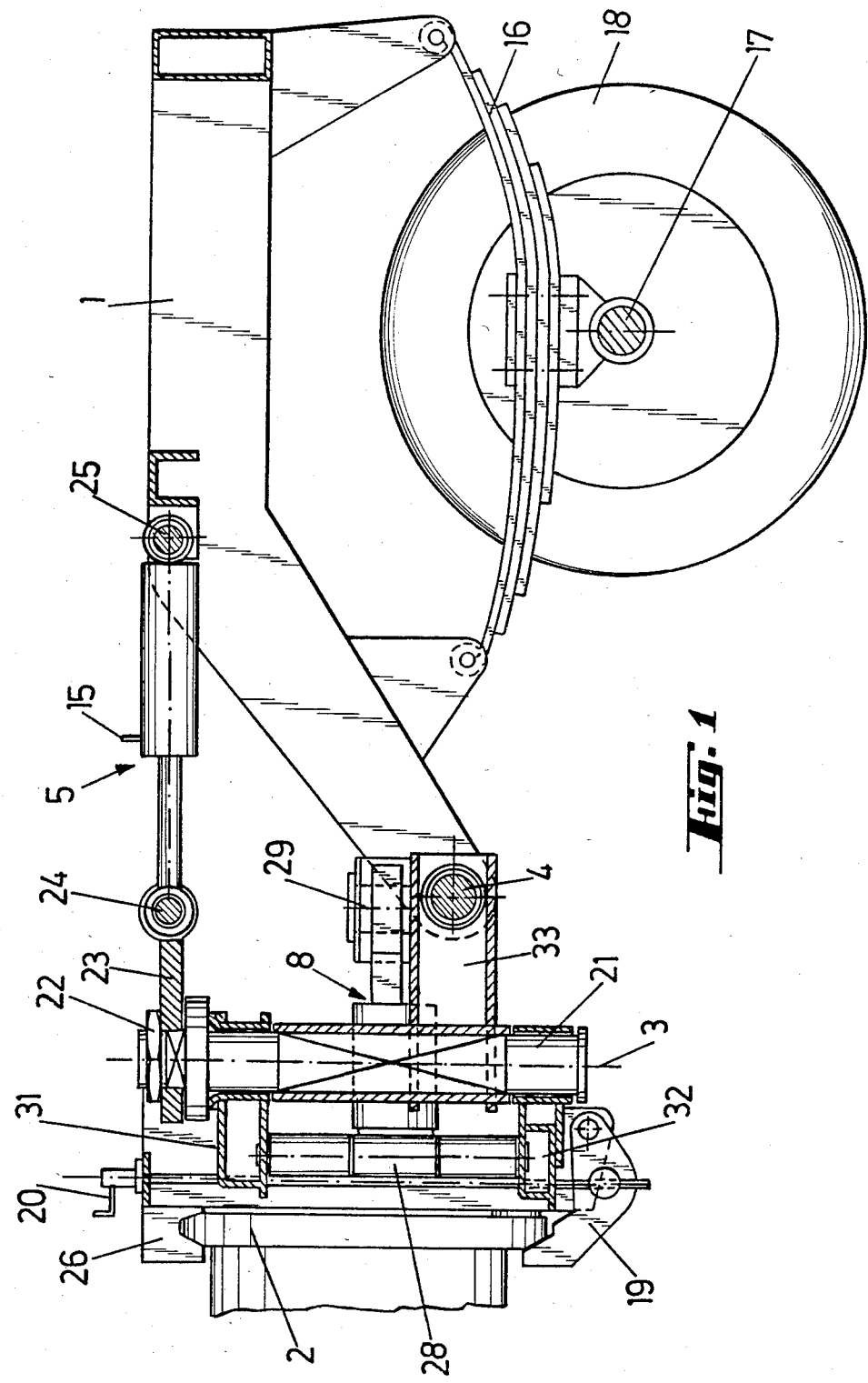
FIG. 1 is a vertical section through the longitudinal median plane.
Figure 2:
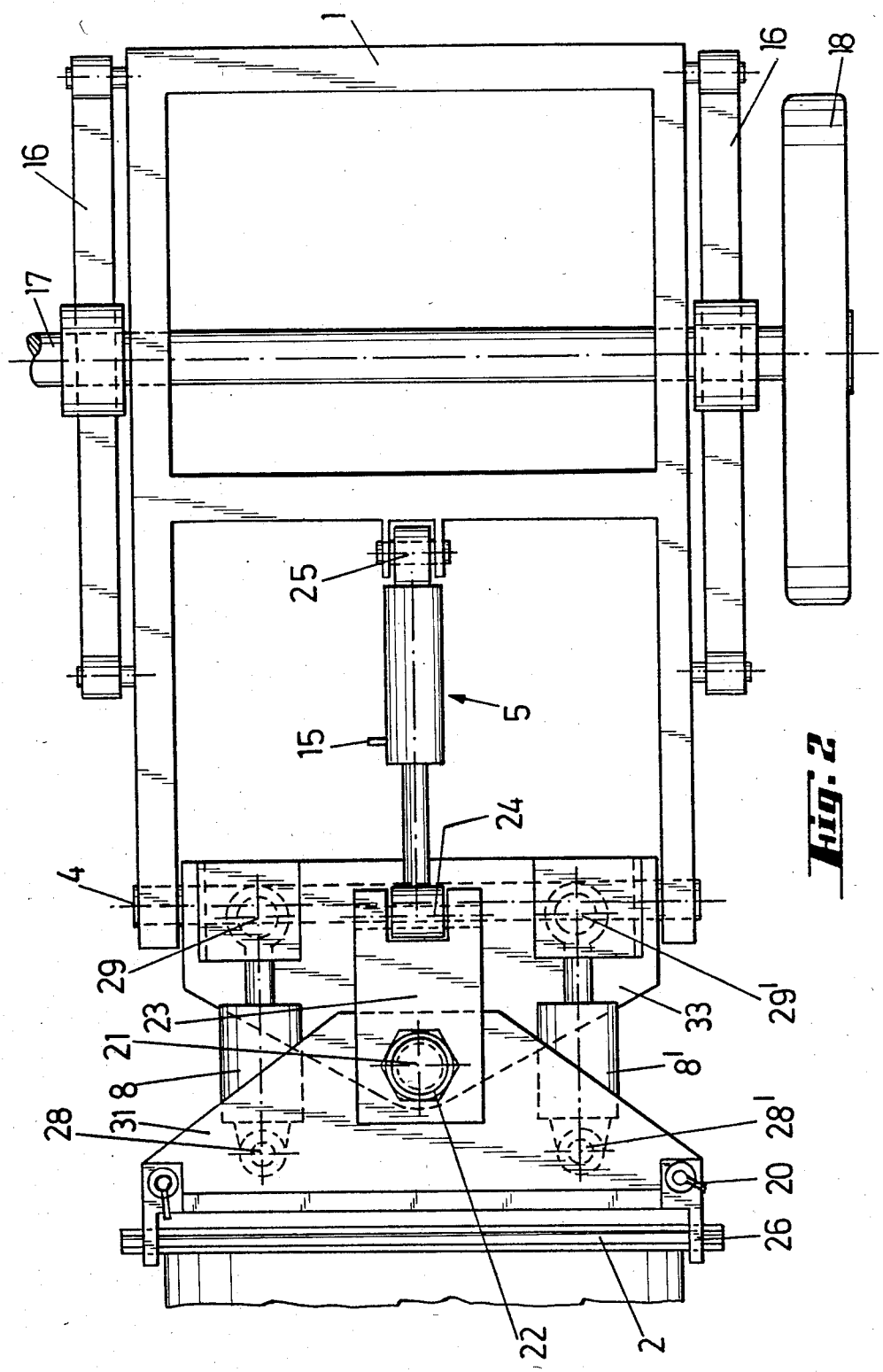
FIG. 2 is a top view of the trailer according to the invention.

The trailer shown in FIGS. 1 and 2 is intended for receiving in particular a loading crane on a supporting frame 1, whose details are not critical to the present invention. It must be possible to bring the trailer by means of a truck to the site where the loading crane is to be used, and during the operation of the loading crane tilting of the trailer is to be excluded by a rigid connection between trailer and truck. The type of connection between trailer and truck thus is decisive for the operation of the device.

For the connection with the trailer the truck, which is not shown, merely has a vertical rigging plate 2. The holding means of the trailer engages this plate 2 with holding claws 26 at the top and with jaws 19 at the bottom. The jaws 19 can be opened and closed by means of a spindle via an actuating lever 20, so that the trailer can either be rigidly connected to the truck or it can be detached therefrom. To enable the trailer to swing laterally, a journal axle 21, about which the plate 33 is horizontally swingable, is supported in the plates 31 and 32 of the fastening means. A mounting support 23 for a hydraulic unit 5 is secured to the upper end of the journal axle 21 by means of a nut 22 so that the hydraulic unit 5, whose function will be explained hereinafter, can follow the motion of the trailer about the vertical axis 3.

The uniaxial trailer itself comprises the supporting frame 1, spring suspension 16 and two wheels 18 supported by the wheel axle 17 and to this extent it has no features which are important for the present invention. It is essential that the supporting frame 1 carried by the wheels 18 be swingable about a transversely extending horizontal axle 4 and that this swinging motion can be blocked in the operating position of the loading crane. The hydraulic unit 5, which is hinged to the mounting support 23 at the points 24 and 25 on the one hand and to the supporting frame 1 on the other, serves this purpose. When the valve 15 is closed the mutual position of the parts of the hydraulic unit 5 is fixed and the supporting frame 1 is rigidly connected to the end of the truck so that the truck together with the wheels 18 can absorb the moments exerted by the loading crane.

As is evident particularly from FIG. 2, the horizontal swinging motion of the trailer can also be stopped. This is particularly desirable for reversing. For this purpose the trailer is provided with hydraulic units 8, 8′, which are hinged to the fastening means at the points 28, 28′ and 29, 29′ on the one hand, namely, to shafts extending between the plates 31 and 32, and to the horizontally swingable plate 33 on the other.

Figure 3:
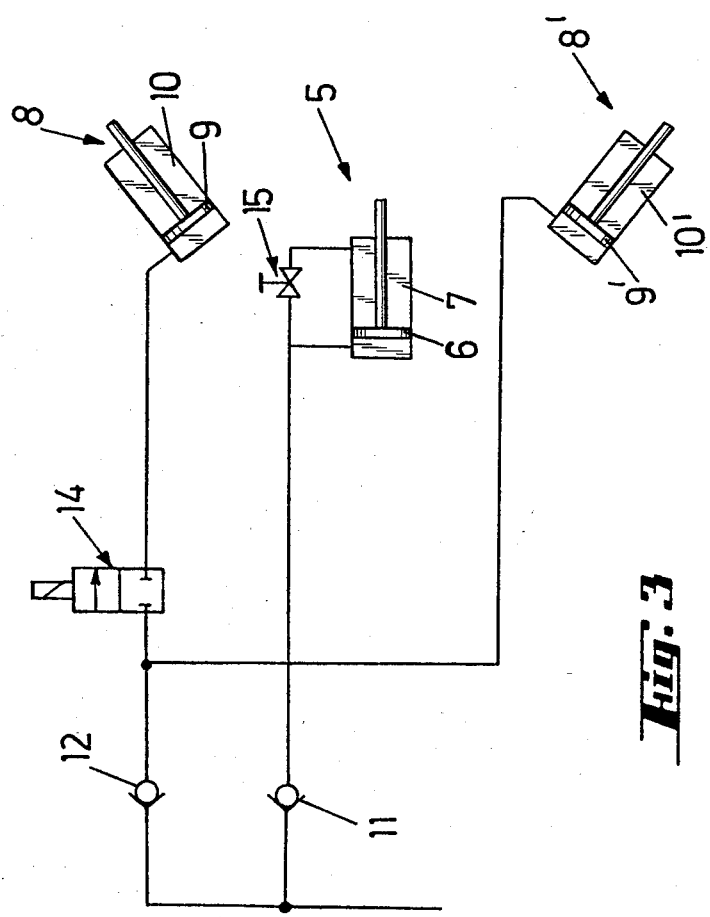
FIG. 3 illustrates the hydraulic circuit diagram pertaining thereto.

The switching operations by means of which the various functions of the trailer coupling can be attained are shown in FIG. 3. With regard to the hydraulic units 8, 8′, the representation in FIG. 3 corresponds to the state in which a horizontal motion of the trailer is blocked. Since the switch 14 is interrupted, no oil can flow from the cylinder 10 and the piston 9 is immovable. The same applies to the cylinder 10′ and the piston 9′ because of the arrangement of the check valve 12. In order to release the horizontal motion of the trailer, it is sufficient to actuate the switch 14, whereupon pressure oil can be exchanged between the cylinders 10 and 10′ so that the motion of the pistons 9, 9′ and thus the motion of the plate 33 and of the trailer is no longer obstructed.

When the trailer is driven forward the valve 15 is open and the hydraulic fluid thus accumulates on both sides of the piston 6 of the hydraulic unit 5 so that the pistons can carry out an attenuated motion in the cylinder 7. However, when the valve 15 is closed the piston 6 is immovable since the valve 15 prevents the hydraulic fluid from flowing from the space ahead of the pistons and the check valve 11 prevents the hydraulic fluid from flowing from the space behind the piston.

I claim:

1. A trailer for a truck having a supporting frame for a loading crane or the like, the trailer selectively being flexibly or rigidly connected to the truck or removed from said truck, characterized in that fastening means are rigidly and detachably connectable to a vertical plate fixed at the rear end of the truck, said fastening means comprising:
   a vertical shaft for pivoting motion of the trailer around a vertical axis;
   a transversely extending horizontal shaft for pivoting motion of the trailer around a horizontal axis, said horizontal shaft being pivotable about a first end of said vertical shaft;
   at least one hydraulic unit having a piston and a cylinder, said hydraulic unit being disposed between the frame of the trailer and the second end of said vertical shaft, such that the relative positions of the piston and cylinder are fixable.

2. A trailer according to claim 1, characterized in that the vertical shaft is arranged between the horizontal shaft and the point of connection between the truck and the fastening means and further characterized in that the hydraulic unit extends substantially horizontally from the frame to the upper end of the vertical shaft.

3. A trailer according to claim 1 or 2, characterized in that at least one hydraulic unit (8,8′) is also provided between the parts of the trailer which are pivotable about the vertical shaft (3) relative to each other, in which unit the mutual position of a piston (9,9′) and cylinder (10,10′) is fixable.

* * * * *